United States Patent
Mericas (10) Patent No.: US 10,400,554 B2
(45) Date of Patent: Sep. 3, 2019

(54) LONGITUDINALLY OFFSET PARTIAL AREAS SCREENS FOR WELL ASSEMBLY

(71) Applicant: Halliburton Energy Services, Inc., Houston, TX (US)

(72) Inventor: Chris James Mericas, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 252 days.

(21) Appl. No.: 15/515,019

(22) PCT Filed: Oct. 28, 2014

(86) PCT No.: PCT/US2014/062701
§ 371 (c)(1),
(2) Date: Mar. 28, 2017

(87) PCT Pub. No.: WO2016/068887
PCT Pub. Date: May 6, 2016

(65) Prior Publication Data
US 2017/0218735 A1    Aug. 3, 2017

(51) Int. Cl.
*E21B 21/00* (2006.01)
*B01D 35/02* (2006.01)
(Continued)

(52) U.S. Cl.
CPC .............. *E21B 43/08* (2013.01); *B01D 29/01* (2013.01); *B01D 29/58* (2013.01); *B01D 35/02* (2013.01); *E21B 17/18* (2013.01); *E21B 21/002* (2013.01)

(58) Field of Classification Search
CPC . E21B 27/005; E21B 21/002; B01D 29/0068; B01D 35/02; B01D 29/018; B01D 29/03; B01D 29/05
See application file for complete search history.

(56) References Cited

U.S. PATENT DOCUMENTS 3,401,758 A    9/1968 Talbert
3,831,753 A *  8/1974 Gaylord ................ B01D 35/02
                                             209/399
(Continued)

FOREIGN PATENT DOCUMENTS

EP    2245261    9/2013
JP    07025912   5/1995
(Continued)

OTHER PUBLICATIONS

Australian Application No. 2014410222, First Examination Report dated Oct. 12, 2017, 3 pages.
(Continued)

*Primary Examiner* — Shane Bomar
(74) *Attorney, Agent, or Firm* — Kilpatrick Townsend & Stockton LLP (57) ABSTRACT

A downhole assembly can include screens along a length of a tubular member. Screens covering differing portions of a cross-sectional area of the tubular and less than an entirety of the cross-sectional area can be offset from one another along a length of the tubular. Fluid flowing through an area not covered by a first screen can encounter an area covered by an offset screen. If the offset screen is blocked with accumulated debris, fluid may pass the offset screen by passing through an area not covered by the offset screen.

16 Claims, 3 Drawing Sheets

(51) Int. Cl.
  *B01D 29/58* (2006.01)
  *E21B 43/08* (2006.01)
  *E21B 17/18* (2006.01)
  *B01D 29/01* (2006.01)

(56) References Cited

U.S. PATENT DOCUMENTS

| | | | | |
|---|---|---|---|---|
| 4,154,313 | A * | 5/1979 | Dysart | E21B 10/18 175/318 |
| 4,341,273 | A * | 7/1982 | Walker | E21B 10/18 175/312 |
| 4,515,212 | A * | 5/1985 | Krugh | E21B 27/00 166/170 |
| 4,732,677 | A | 3/1988 | Thornton et al. | |
| 4,981,368 | A | 1/1991 | Smith | |
| 5,249,626 | A | 10/1993 | Gibbins | |
| 6,276,452 | B1 * | 8/2001 | Davis | E21B 21/002 166/107 |
| 6,352,111 | B1 | 3/2002 | Bode et al. | |
| 6,382,318 | B1 | 5/2002 | Whitlock et al. | |
| 6,574,869 | B1 | 6/2003 | McHenry et al. | |
| 7,093,653 | B2 | 8/2006 | Metcalfe et al. | |
| 7,188,687 | B2 | 3/2007 | Rudd et al. | |
| 7,188,688 | B1 | 3/2007 | LeJeune et al. | |
| 7,472,745 | B2 * | 1/2009 | Lynde | E21B 27/005 166/165 |
| 2004/0040703 | A1 | 3/2004 | Longmore et al. | |
| 2004/0244988 | A1 | 12/2004 | Preston et al. | |
| 2005/0039813 | A1 | 2/2005 | Dougherty et al. | |
| 2005/0200127 | A1 | 9/2005 | Johnson et al. | |
| 2008/0087419 | A1 * | 4/2008 | Fair | B01D 35/02 166/234 |
| 2008/0308274 | A1 | 12/2008 | MacDougall et al. | |
| 2009/0238729 | A1 | 9/2009 | Glover et al. | |
| 2011/0049025 | A1 * | 3/2011 | Davis | B01D 35/02 210/109 |
| 2011/0192602 | A1 * | 8/2011 | Yeh | E21B 43/12 166/276 |
| 2012/0292047 | A1 | 11/2012 | Knobloch, Jr. et al. | |
| 2013/0025865 | A1 | 1/2013 | Knobloch, Jr. et al. | |
| 2015/0267511 | A1 * | 9/2015 | Patterson | E21B 12/00 166/381 |
| 2017/0355624 | A1 * | 12/2017 | Baski | B01D 29/0068 |
| 2018/0266231 | A1 * | 9/2018 | Rogers | E21B 27/005 |

FOREIGN PATENT DOCUMENTS

| | | |
|---|---|---|
| KR | 1020020092569 | 12/2002 |
| NL | 1021873 | 5/2004 |
| WO | 2014065962 | 5/2014 |
| WO | 2016060648 | 4/2016 |
| WO | 2016068885 | 5/2016 |
| WO | 2016072982 | 5/2016 |
| WO | 2017007447 | 1/2017 |

OTHER PUBLICATIONS

Canadian Application No. 2,962,008, Office Action dated Feb. 8, 2018, 3 pages.

European Application No. 14905015.5, Extended European Search Report dated Mar. 16, 2018, 10 pages.

International Patent Application No. PCT/US2014/062701, International Search Report and Written Opinion dated Jul. 28, 2015, 11 pages.

* cited by examiner

LONGITUDINALLY OFFSET PARTIAL AREAS SCREENS FOR WELL ASSEMBLY

CROSS-REFERENCE TO RELATED APPLICATIONS

This is a U.S. national phase under 35 U.S.C. 371 of International Patent Application No. PCT/US2014/062701 titled "Longitudinally Offset Partial Area Screens For Well Assembly" and filed Oct. 28, 2014, the entirety of which is incorporated herein by reference.

TECHNICAL FIELD

The present disclosure relates generally to devices for use in a wellbore in a subterranean formation and, more particularly (although not necessarily exclusively), to assemblies of longitudinally offset screens that cover different portions of a cross-sectional area of a tubular.

BACKGROUND

Preparing a well assembly traversing a hydrocarbon bearing subterranean formation often involves running a string of tubular members (often individually called "tubulars" or "joints") from surface into place in a wellbore. The string can be filled with fluid by permitting wellbore fluid to enter the string, such as through "auto-filling" equipment at a lower-most end of the string. The wellbore fluid can contain debris, such as debris from drilling or another operation. The debris can adversely affect the performance of the auto-fill equipment, which can necessitate filling from surface and the associated costs in time and resources. Additionally or alternatively, debris passing the auto-filling equipment can become trapped in the tubulars. The trapped debris can settle within the tubulars and form masses that can impede or hinder subsequent operations in the wellbore.

DETAILED DESCRIPTION

Certain aspects and examples of the present disclosure are directed to assemblies of longitudinally offset screens that extend over or cover different portions of a cross-sectional area of a tubular. A screen assembly can include a series of screens arranged along a length of a tubular member. The screens can cover different portions of a cross-sectional area of the tubular. An entirety of the cross-sectional area of the tubular may be covered by the series of screens along the length of the tubular. For example, the screens can be different shapes. The shape of a screen may permit some fluid to bypass the screen without being filtered through the screen. The shape of another screen can be oriented so that fluid bypassing the shape of the first screen without being filtered can be filtered through the filtering shape of the second screen. The screen assembly can reduce an amount of debris passing out of the screen assembly and into a tubular section beyond the screen assembly.

A screen can have a cross-sectional area that is the same as an area that the screen covers. In an illustrative example, the tubular can have a cross-sectional area defined within a large circle. The first screen can be shaped as a small circle and be positioned in the tubular so that the area of the small circle covers, or is the same as, a central portion of the large circle. The second screen can be shaped like a ring and can be positioned in the tubular so that the area of the ring covers, or is the same as, the annular part of the large circle that is not covered by the small circle of the first screen (i.e., extending radially outward from the boundary of the small circle to the boundary of the large circle). The small circle and the ring can be positioned at different distances along a length of the tubular. In this arrangement, fluid flowing axially through the large circle of the tubular can flow through either the small circle covered by the first screen or the ring covered by the second screen. If the first or the second screen become blocked by screened particles, the fluid can deviate from a straight axial flow path to flow around the blocked screen along a different axial flow path through the part of the large circle that is not covered by the blocked screen.

In some aspects, fluid bypassing a filtering shape of a first screen also can be permitted to bypass a filtering shape of a second screen. For example, fluid may bypass filtering shapes of sequential screens when the sequential screens are blocked with accumulated debris.

In some aspects, a screen can capture particles carried by a fluid flowing from a first end of the tubular. The screen can include a rim that can prevent particles caught by the screen from being swept across an edge of the filtering shape and past the screen. The rim can extend away from the screen toward the first end of the tubular. Fluid flowing through the screen in an opposite direction (i.e., toward the first end of the tubular) can flush captured particles from the screen. The particles can be carried toward the first end of the tubular and past other screens through portions of the cross-sectional area of the tubular that are not covered by the other screens.

These illustrative examples are given to introduce the reader to the general subject matter discussed here and are not intended to limit the scope of the disclosed concepts. The following describes various additional aspects and examples with reference to the drawings in which like numerals indicate like elements, and directional descriptions are used to describe the illustrative aspects. The following uses directional descriptions such as "upper," "lower," etc. in relation to the illustrative aspects as they are depicted in the figures. Like the illustrative aspects, the numerals and directional descriptions included in the following should not be used to limit the present disclosure.

Figure 1:
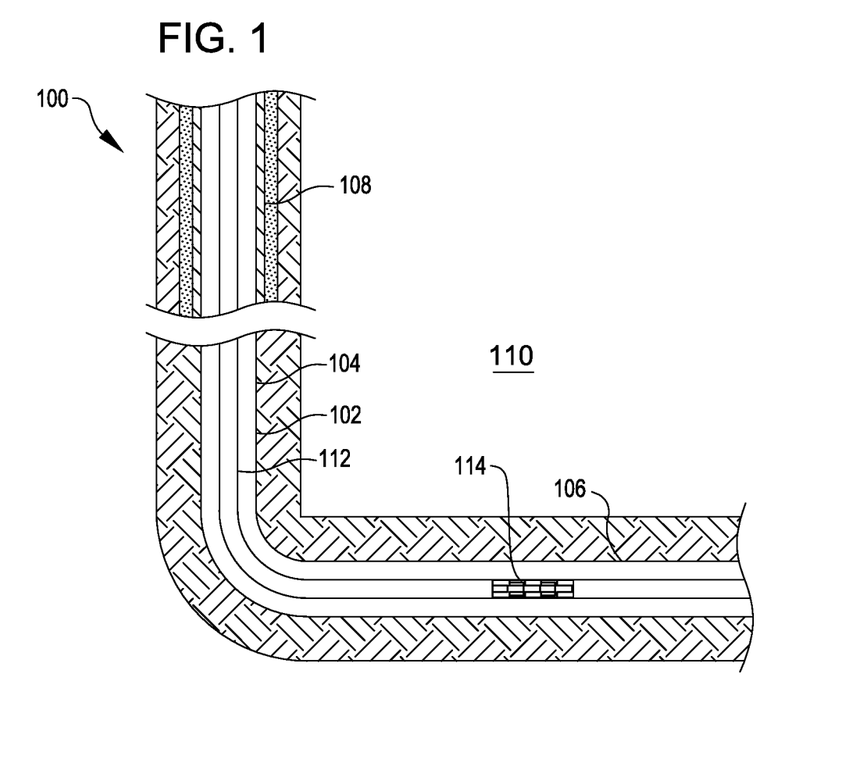
FIG. 1 is a schematic illustration of a well system having a screen assembly according to one aspect of the present disclosure.

FIG. 1 schematically depicts an example of a well system 100 having a screen assembly 114. The well system 100 includes a bore that is a wellbore 102 extending through various earth strata. The wellbore 102 has a substantially vertical section 104 and a substantially horizontal section 106. The substantially vertical section 104 can include a casing string 108 cemented at an upper portion of the substantially vertical section 104. In some aspects, the casing string 108 can extend into the substantially horizontal section 106. The substantially horizontal section 106 (or the substantially vertical section 104 or both) can extend through a hydrocarbon bearing subterranean formation 110.

A tubing string 112 within the wellbore 102 can extend from the surface to the subterranean formation 110. The tubing string 112 can provide a conduit for formation fluids, such as production fluids produced from the subterranean formation 110, to travel from the substantially horizontal section 106 to the surface. Pressure from a bore in a subterranean formation 110 can cause formation fluids, including production fluids such as gas or petroleum, to flow to the surface. In some aspects, the tubing string 112 can provide a conduit for introducing material into the wellbore 102, such as cement for casing operations or fluids for modulating pressure conditions in the wellbore.

The well system 100 can also include a screen assembly 114. The filter assembly can be installed in the tubing string 112. The screen assembly 114 can include features that prevent particulate from moving past the screen assembly 114 into another part of the tubing string 112, such as when the tubing string 112 is run into the wellbore 102. Features of the screen assembly 114 can prevent the screen assembly 114 from blocking due to accumulated particulate. Features of the screen assembly 114 additionally or alternatively can facilitate flushing the screen assembly 114 of particulate accumulated in the screen assembly 114.

Although the well system 100 is depicted with one screen assembly 114, any number of screen assemblies 114 can be used in the well system 100. Additionally, although FIG. 1 depicts the screen assembly 114 in the substantially horizontal section 106, the screen assembly 114 can be located, additionally or alternatively, in the substantially vertical section 104. In some aspects, screen assembly 114 can be disposed in simpler wellbores, such as wellbores having only a substantially vertical section. The screen assembly 114 can be disposed in openhole environments, as depicted in FIG. 1, or in cased wells. Different types of screen assemblies 114 can be used in the well system 100 depicted in FIG. 1.

Figure 2:
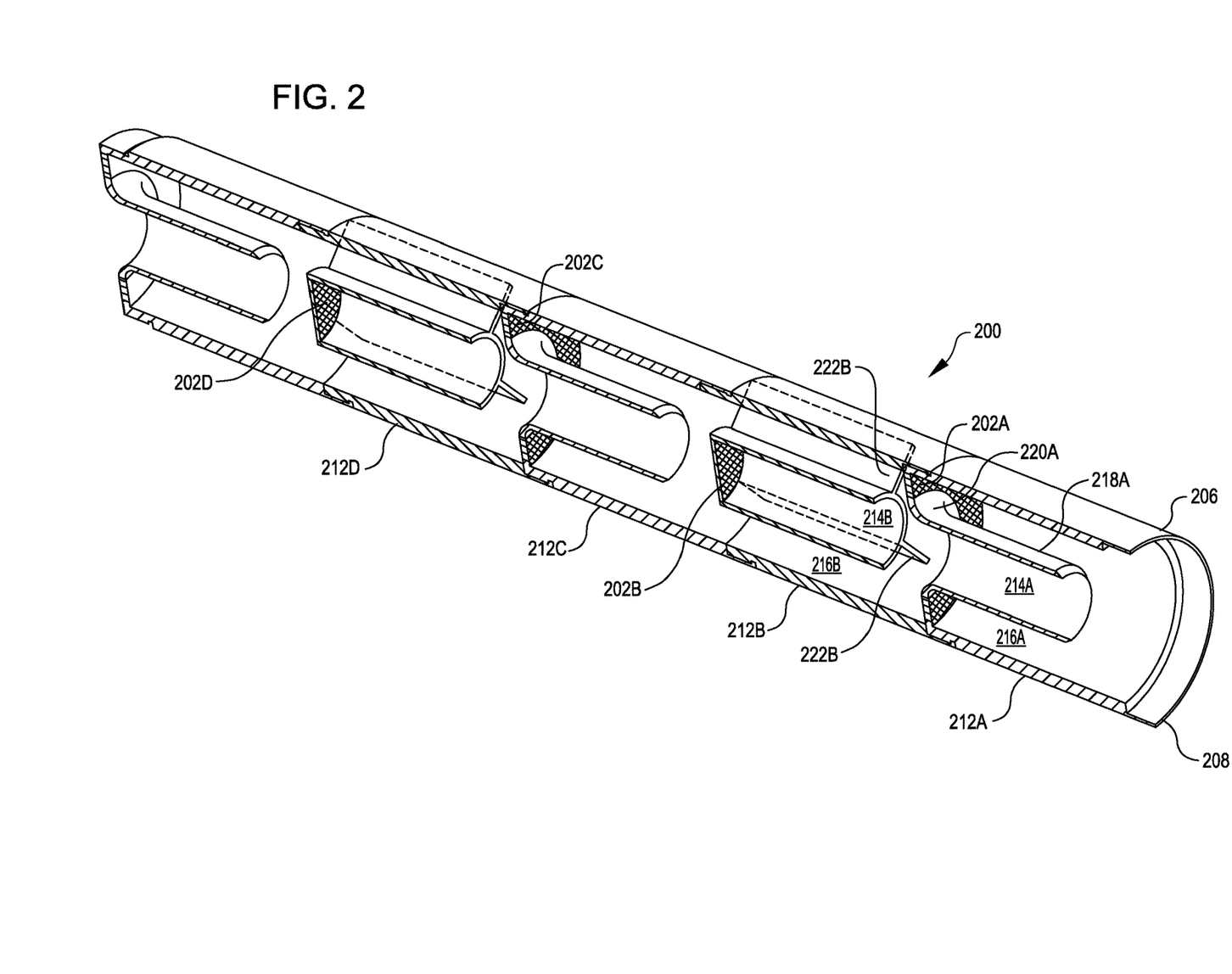
FIG. 2 is a perspective cutaway view of an example of a screen assembly according to certain aspects of the present disclosure.

FIG. 2 is a perspective cutaway view of one example of a screen assembly 200 according to some aspects. The screen assembly 200 can include screens 202 (e.g., a first screen 202A, a second screen 202B, a third screen 202C, and a fourth screen 202D). The screens 202 can be positioned within a tubular member 206. The screens 202 can include openings sized to permit the passage of fluid through the screens, yet block passage of particulate carried by fluid flowing through the screen assembly 200. The tubular member 206 can be divided into sections 212 (e.g., a first section 212A, a second section 212B, a third section 212C, and a fourth section 212D). Each section 212 can correspond to a respective screen 202. In some aspects, the tubular member 206 can form part of a tubing string, such as the tubing string 112 in FIG. 1. In some aspects, the tubular member 206 may be inserted in to a tubing string 112 having an internal diameter that is larger than an external diameter of tubular member 206.

The screens 202 can be longitudinally offset from one another in the tubular member 206. For example, a first screen 202A positioned in a first section 212A can be closer to a first end 208 of the tubular member 206 than a second screen 202B positioned in a second section 212B.

Figure 3:
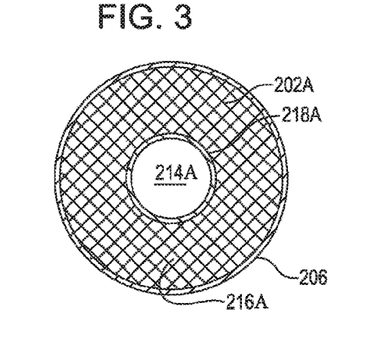
FIG. 3 is an end view of an example of a screen of the screen assembly of FIG. 2 according to certain aspects of the present disclosure.
Figure 4:
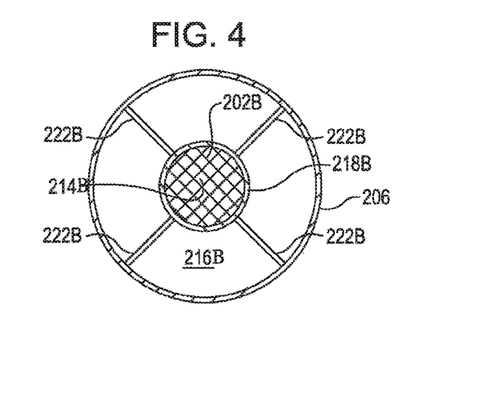
FIG. 4 is an end view of another example of a screen of the screen assembly of FIG. 2 according to certain aspects of the present disclosure.

The screens 202 can cover different portions of a cross-sectional area of the tubular member 206. The different portions may collectively cover an entirety of the cross-sectional area. An example is provided with reference to FIGS. 3-4. FIG. 3 is an end view of the first screen 202A of the screen assembly 200 according to some aspects. FIG. 4 is an end view of the second screen 202B of the screen assembly 200 according to some aspects.

The first screen 202A (FIG. 3) can have an annular shape between an interior edge of the tubular member 206 and a central area 214A of the cross-sectional area of the tubular member 206. The annular shape of the first screen 202A can cover a peripheral area 216A of the cross-sectional area without covering the central area 214 of the cross-sectional area The second screen 202B (FIG. 4) can have a round shape covering the central area 214B without covering the peripheral area 216B. The first screen 202A and the second screen 202B can thus collectively cover the entirety of the cross-sectional area of the tubular member 206. Collectively covering the entirety of the cross-sectional area of the tubular member 206 with screens 202 can reduce an amount of particles that may be carried through the screen assembly 200.

Although the entirety of the cross-sectional area of the tubular member 206 can be covered by a first screen 202A and a second screen 202B covering opposite portions of the cross-sectional area of the tubular member 206 as just described, other arrangements are possible. For example, the entirety of the cross-sectional area may be covered by a group of two, three, or more screens of complimentary shapes. In some aspects, a shape of one screen may be larger than an area not covered by another screen such that a portion of the cross-sectional area is covered multiple times where the shapes overlap.

The first screen 202A (FIG. 3) and the second screen 202B (FIG. 4) can each cover less than an entirety of the cross-sectional area of the tubular member 206. For example, the shape of the first screen 202A (FIG. 3) can leave the central area 214A uncovered, while the shape of the second screen 202B (FIG. 4) may leave the peripheral area 216B uncovered. Leaving at least a portion of the cross-sectional area of the tubular member 206 uncovered by a particular screen 202 can permit fluid to flow past the particular screen 202 when the particular screen 202 is blocked by particles.

Referring again to FIG. 2, the first screen 202A can include a first rim 218A. The first rim 218A can extend away from the first screen 202A and toward the first end 208 of the tubular member 206. In some aspects, the first rim 218A can be a tube. The first rim 218A can be positioned at a boundary of the portion of the cross-sectional area of the tubular member 206 covered by the first screen 202A. For example, the first rim 218A can be positioned at a boundary between the peripheral area 216 and the central area 214 (such as shown in both FIGS. 2 and 3). The first rim 218A can be sized to prevent particulate caught in the peripheral area 216A by the first screen 202A from crossing the boundary into the central area 214A and flowing past the first screen 202A. For example, the first rim 218A can extend toward the first end 208 of the tubular member 206 a sufficient amount to prevent particles from being swept from the first screen 202A and through the central area 214A by fluid flowing from the first end 208.

The second screen 202B can include a second rim 218B. The second rim 218B can extend away from the second screen 202B and toward the first end 208 of the tubular member 206. In some aspects, the second rim 218B can be a tube. The second rim 218B can be positioned at a boundary of the portion of the cross-sectional area of the tubular member 206 covered by the second screen 202B. For example, the second rim 218B can be positioned at a boundary between the central area 214B and the peripheral area 216B (such as shown in both FIGS. 2 and 4). The second rim 218B can be sized to prevent particulate caught in the central area 214B by the second screen 202B from crossing the boundary into the peripheral area 216B and flowing past the second screen 202B. For example, the second rim 218B can extend toward the first end 208 of the tubular member 206 a sufficient amount to prevent particles from being swept from the second screen 202B and through the peripheral area 216B by fluid flowing from the first end 208.

In some aspects, the second rim 218B may be supported relative to the tubular member 206 by one or more flanges 222B (e.g., FIGS. 2 and 4). The second screen 202B may be supported relative to the tubular member 206 by the second rim 218B. In some aspects, the first screen 202A may be supported relative to the tubular member 206 by coupling with an interior edge of the tubular member 206 (e.g., FIG. 2-3). The first rim 218A may be supported relative to the tubular member 206 by the first screen 202A. In some aspects, the first rim 218A additionally or alternatively may be supported by flanges similar to the flanges 222B, although not shown in FIGS. 2-3.

Figure 5:
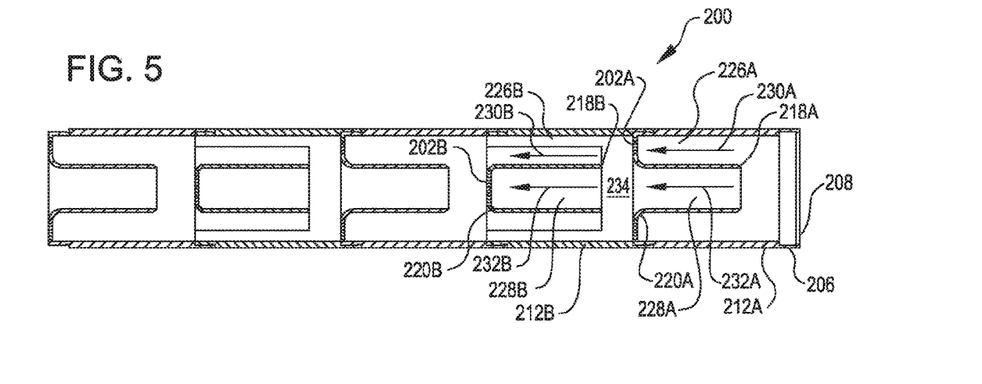
FIG. 5 is a side cutaway view of the screen assembly of FIG. 2 according to certain aspects of the present disclosure.

FIG. 5 is a side cutaway view of the screen assembly 200 according to some aspects. In some aspects, the first rim 218A separates flow paths 226A, 228A through the first section 212A of the tubular member 206. For example, fluid flowing from the first end 208 of the tubular member 206 may encounter the first rim 218A and be directed through a first flow path 226A and a second flow path 228A. The first screen 202A can be positioned in the first flow path 226A. For example, the first screen 202A can cover an entirety of a cross-section of the first flow path 226A. The first screen 202A may prevent some particles carried by the fluid from passing the first section 212A.

The second flow path 228A of the first section 212A may be less screened than the first flow path 226A. For example, the first screen 202A may cover the second flow path 228A a negligible amount and permit particles to flow through the second flow path 228A without much, if any, screening. Fluid directed through the second flow path 228A of the first section 212A may carry at least some particles through the first section 212A and into the second section 212B.

The second rim 218B can separate the second section 212B into another first flow path 226B and another second flow path 228B. The second screen 202B can be positioned in the second flow path 228B of the second section 212B.

In some aspects, the first rim 218A and the second rim 218B are longitudinally aligned. Longitudinally aligning the first rim 218A and the second rim 218B may align flow paths of the first section 212A and the second section 212B for longitudinal fluid flow through at least one screen 202. For example, fluid can flow through the first flow paths 226A, 226B and the first screen 202A (such as depicted by the arrows 230A and 230B) or through the second flow paths 228A, 228B and the second screen 202B (such as depicted by the arrows 232A and 232B).

In some aspects, the first rim 218A and the second rim 218B are longitudinally offset. For example, a longitudinal gap 234 may be positioned between the first rim 218A and the second rim 2188. Longitudinally offsetting the first rim 218A and the second rim 218B can permit fluid to flow separately from aligned flow paths of the first section 212A and the second section 212B. For example, fluid can flow from the second flow path 228A of the first section 212A to the first flow path 226B of the second section 212B through a third flow path (such as the longitudinal gap 234) without passing through the first screen 202A or the second screen 202B (such as depicted by the arrows 232A and 230B). Such a flow may permit fluid to continue traveling through the tubular member 206 when the screens 202A, 202B are blocked with particles.

In some aspects, particles captured by the screens 202 can be flushed by directing fluid toward the first end 208 of the tubular member 206. For example, particles captured by the second screen 202B can be carried out through the second flow path 228B in the second section 212B and the aligned second flow path 228A of the first section 212A (such as opposite the arrows 232B, 232A). Particles carried through the first flow path 226B of the second section 212B can pass through the gap 234 and out through the second flow path 228A of the first section 212A (such as opposite the arrows 230B, 232A). The first rim 218A can include a tapered portion 220A that tapers away from the first flow path 226B of the second section 2128 and toward the second flow path 228A of the first section 212A. Such a tapered portion 220A can direct flushed particles toward the open and unscreened second flow path 228A of the first section 212A. Similarly, the second rim 218B can include a tapered portion 220B that directs particles from away from the screened second flow path 228B (e.g., away from edges of the second screen 202B) and toward the open and unscreened first flow path 226B of the second section 212B.

In some aspects, a downhole assembly, a system, or a method is provided according to one or more of the following examples or according to some combination of the elements thereof. In some aspects, a tool or a system described in one or more of these examples can be utilized to perform a method described in one of the other examples.

Example #1

Provided can be a downhole assembly comprising (I) a first screen covering a first portion of a cross-sectional area of a tubular, the first portion being less than an entirety of the cross-sectional area; and (II) a second screen covering a second portion of the cross-sectional area, the second portion being less than the entirety of the cross-sectional area and different from the first portion, the second screen longitudinally offset from the first screen within the tubular.

Example #2

Provided can be the downhole assembly of Example #1, wherein the entirety of the cross-sectional area is covered by a group of longitudinally offset screens including the first screen and the second screen.

Example #3

Provided can be the downhole assembly of Example #1 (or any of Examples #1-2), wherein the first screen further comprises a first rim positioned at a boundary of the first portion, the first rim sized to prevent particulate caught by the first screen from crossing the boundary of the first portion and flowing past the first screen.

Example #4

Provided can be the downhole assembly of Example #3 (or any of Examples #1-3), wherein the second screen further comprises a second rim positioned at a boundary of the second portion, the second rim sized to prevent particulate caught by the second screen from crossing the boundary of the second portion and flowing past the second screen, wherein the first rim and the second rim are longitudinally aligned.

Example #5

Provided can be the downhole assembly of Example #4 (or any of Examples #1-4), comprising a longitudinal gap between the first rim and the second rim.

Example #6

Provided can be the downhole assembly of Example #4 (or any of Examples #1-5), wherein the first rim and the second rim are longitudinally offset from each other.

Example #7

Provided can be the downhole assembly of Example #1 (or any of Examples #1-6), wherein the second portion is a central portion of the cross-sectional area of the tubular and the first portion is an annular portion about the central portion or a peripheral portion of the cross-sectional area of the tubular.

Example #8

Provided can be a downhole assembly (or the downhole assembly of any of Examples #1-7), comprising (I) a first section of a tubular, the first section comprising (i) a first section first flow path, (ii) a first screen positioned in the first section first flow path, and (iii) a first section second flow path; and (II) a second section of the tubular, the second section disposed longitudinally from the first section, the second section comprising (i) a second section first flow path longitudinally aligned with the first section first flow path, (ii) a second section second flow path longitudinally aligned with the first section second flow path, and (iii) a second screen positioned in the second section second flow path.

Example #9

Provided can be the downhole assembly of Example #8 (or any of Examples #1-8), further comprising a third flow path permitting fluid flow between the first section second flow path and the second section first flow path.

Example #10

Provided can be the downhole assembly of Example #8 (or any of Examples #1-9), wherein the first section first flow path is separated from the first section second flow path by a first rim extending from the first screen toward a first end of the tubular.

Example #11

Provided can be the downhole assembly of Example #10 (or any of Examples #1-10), wherein the first rim comprises a section that tapers away from the second section first flow path and towards the first section second flow path.

Example #12

Provided can be the downhole assembly of Example #10 (or any of Examples #1-11), wherein the second section first flow path is separated from the second section second flow path by a second rim extending from the second screen toward the first end of the tubular.

Example #13

Provided can be the downhole assembly of Example #12 (or any of Examples #1-12), wherein the first rim comprises a first tube and the second rim comprises a second tube.

Example #14

Provided can be the downhole assembly of Example #13 (or any of Examples #1-13), further comprising one or more flanges supporting at least one of the first tube or the second tube relative to the tubular.

Example #15

Provided can be the downhole assembly of Example #12 (or any of Examples #1-14), wherein the first rim is supported relative to the tubular by the first screen or the second rim is supported relative to the tubular by the second screen.

Example #16

Provided can be the downhole assembly of Example #12 (or any of Examples #1-15), wherein the first screen is supported relative to the tubular by the first rim or the second screen is supported relative to the tubular by the second rim.

Example #17

Provided can be the downhole assembly of Example #8 (or any of Examples #1-16), wherein the first screen covers an entirety of a cross-section of the first section first flow path, and wherein the second screen covers an entire cross-section of the second section second flow path.

Example #18

Provided can be a method comprising (I) directing a fluid to flow away from a first end of a tubular and through a first section of the tubular so that (i) at least some of the fluid flows through a first screen of a first screened flow path of the first section and at least some particles carried by the fluid are prevented from passing the first section by the first screen, and (ii) at least some of the fluid flows through a first open flow path of the first section, the first open flow path being less screened than the first screened flow path; and (II) directing the fluid flowing through the first section to flow through a second section of the tubular so that at least some of the fluid flowing through the first open flow path flows through a second screen of a second screened flow path of the second section and at least some particles carried by the fluid are prevented from passing the second section by the second screen.

Example #19

Provided can be the method of Example #18, further comprising directing the fluid flowing through the first section to flow through the second section of the tubular so that, when the second screen is blocked by particles, at least some of the fluid flowing through the first open flow path flows through a second open flow path of the second section, the second open flow path being less screened than the second screened flow path.

Example #20

Provided can be the method of Example #18 (or any of Examples #18-19), further comprising (I) directing a fluid to flow toward the first end of the tubular and through the second section so that at least some of the fluid flows through the second screen so that particles that were captured by the second screen are carried by the fluid through the second screened flow path and out of the second section; and (II) directing the fluid flowing through the second section to flow through the first section so that at least some of the fluid flowing out of the second screened flow path with particles flows through the first open flow path and carries at least some of the particles out of the first section.

The foregoing description, including illustrated aspects and examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of this disclosure.

What is claimed is:

1. A downhole assembly comprising:
   a tubular for use in a production tubing of a wellbore;
   a first screen covering a first portion of a cross-sectional area of the tubular, the first portion being less than an entirety of the cross-sectional area; and
   a second screen covering a second portion of the cross-sectional area, the second portion being less than the entirety of the cross-sectional area and different from the first portion, the second screen longitudinally offset from the first screen within the tubular, wherein the first screen further comprises a first rim positioned at a boundary of the first portion, the first rim sized to prevent particulate caught by the first screen from crossing the boundary of the first portion and flowing past the first screen, wherein the second screen further comprises a second rim positioned at a boundary of the second portion, the second rim sized to prevent particulate caught by the second screen from crossing the boundary of the second portion and flowing past the second screen, wherein the first rim and the second rim are longitudinally aligned and wherein at least one of the first rim or the second rim is supported relative to the tubular by a flange.

2. The downhole assembly of claim 1, wherein the entirety of the cross-sectional area is covered by a group of longitudinally offset screens including the first screen and the second screen.

3. The downhole assembly of claim 1, comprising a longitudinal gap between the first rim and the second rim.

4. The downhole assembly of claim 1, wherein the first rim and the second rim are longitudinally offset from each other.

5. The downhole assembly of claim 1, wherein the second portion is a central portion of the cross-sectional area of the tubular and the first portion is an annular portion about the central portion or a peripheral portion of the cross-sectional area of the tubular.

6. A downhole assembly, comprising
   a first section of a tubular for use in a production tubing, the first section comprising (i) a first section first flow path, (ii) a first screen positioned in the first section first flow path, and (iii) a first section second flow path; and
   a second section of the tubular, the second section disposed longitudinally from the first section, the second section comprising (i) a second section first flow path longitudinally aligned with the first section first flow path, (ii) a second section second flow path longitudinally aligned with the first section second flow path, and (iii) a second screen positioned in the second section second flow path,
   wherein the first section first flow path is separated from the first section second flow path by a first rim extending from the first screen toward a first end of the tubular,
   wherein the second section first flow path is separated from the second section second flow path by a second rim extending from the second screen toward the first end of the tubular, and wherein the first rim is supported relative to the tubular by the first screen or the second rim is supported relative to the tubular by the second screen.

7. The downhole assembly of claim 6, further comprising a third flow path permitting fluid flow between the first section second flow path and the second section first flow path.

8. The downhole assembly of claim 6, wherein the first rim comprises a section that tapers away from the second section first flow path and towards the first section second flow path.

9. The downhole assembly of claim 6, wherein the first rim comprises a first tube and the second rim comprises a second tube.

10. The downhole assembly of claim 9, further comprising one or more flanges supporting at least one of the first tube or the second tube relative to the tubular.

11. The downhole assembly of claim 6, wherein the first screen is supported relative to the tubular by the first rim or the second screen is supported relative to the tubular by the second rim.

12. The downhole assembly of claim 6, wherein the first screen covers an entirety of a cross-section of the first section first flow path, and wherein the second screen covers an entire cross-section of the second section second flow path.

13. A method comprising:
   directing a fluid to flow away from a first end of a tubular for use in a production tubing and through a first section of the tubular so that (i) at least some of the fluid flows through a first screen of a first screened flow path of the first section and at least some particles carried by the fluid are prevented from passing the first section by the first screen, and (ii) at least some of the fluid flows through a first open flow path of the first section, the first open flow path being less screened than the first screened flow path, wherein the first screened flow path is separate from the first open flow path by a first rim extending from the first screen toward a first end of the tubular, and wherein the first rim comprises a section that tapers away from the first open flow path and towards the first screened flow path; and
   directing the fluid flowing through the first section to flow through a second section of the tubular so that at least some of the fluid flowing through the first open flow path flows through a second screen of a second screened flow path of the second section and at least some particles carried by the fluid are prevented from passing the second section by the second screen, wherein the second screened flow path is separate from a second open flow path by a second rim extending from the second screen toward the first end of the tubular, and wherein the second rim comprises a section that tapers away from the second open flow path and towards the second screened flow path, and wherein at least one of the first rim or the second rim is supported relative to the tubular by a flange.

14. The method of claim 13, further comprising directing the fluid flowing through the first section to flow through the second section of the tubular so that, when the second screen is blocked by particles, at least some of the fluid flowing through the first open flow path flows through a second open flow path of the second section, the second open flow path being less screened than the second screened flow path.

15. The method of claim 13, further comprising:
- directing a fluid to flow toward the first end of the tubular and through the second section so that at least some of the fluid flows through the second screen so that particles that were captured by the second screen are carried by the fluid through the second screened flow path and out of the second section; and
- directing the fluid flowing through the second section to flow through the first section so that at least some of the fluid flowing out of the second screened flow path with particles flows through the first open flow path and carries at least some of the particles out of the first section.

16. The downhole assembly of claim 6, wherein at least one of the first rim or the second rim is supported relative to the tubular by a flange.

* * * * *